D. A. PICKENS.
SPRING HUB.
APPLICATION FILED MAY 5, 1911.
1,013,436.
Patented Jan. 2, 1912.
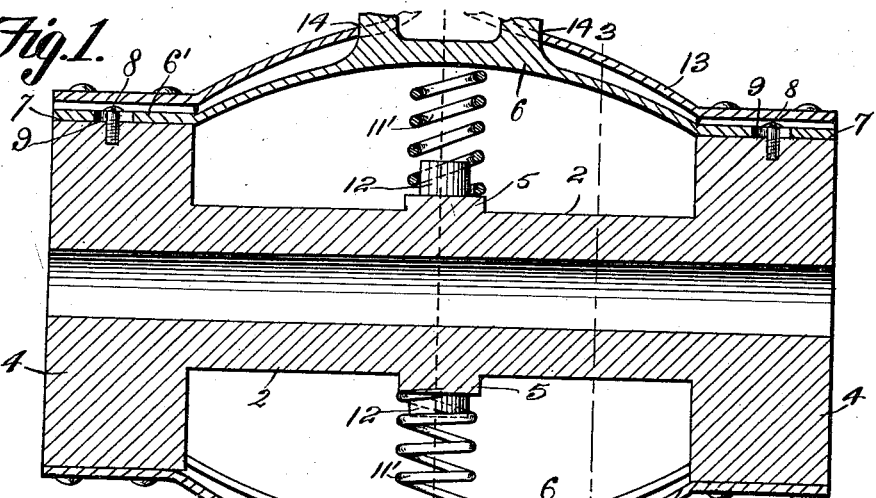
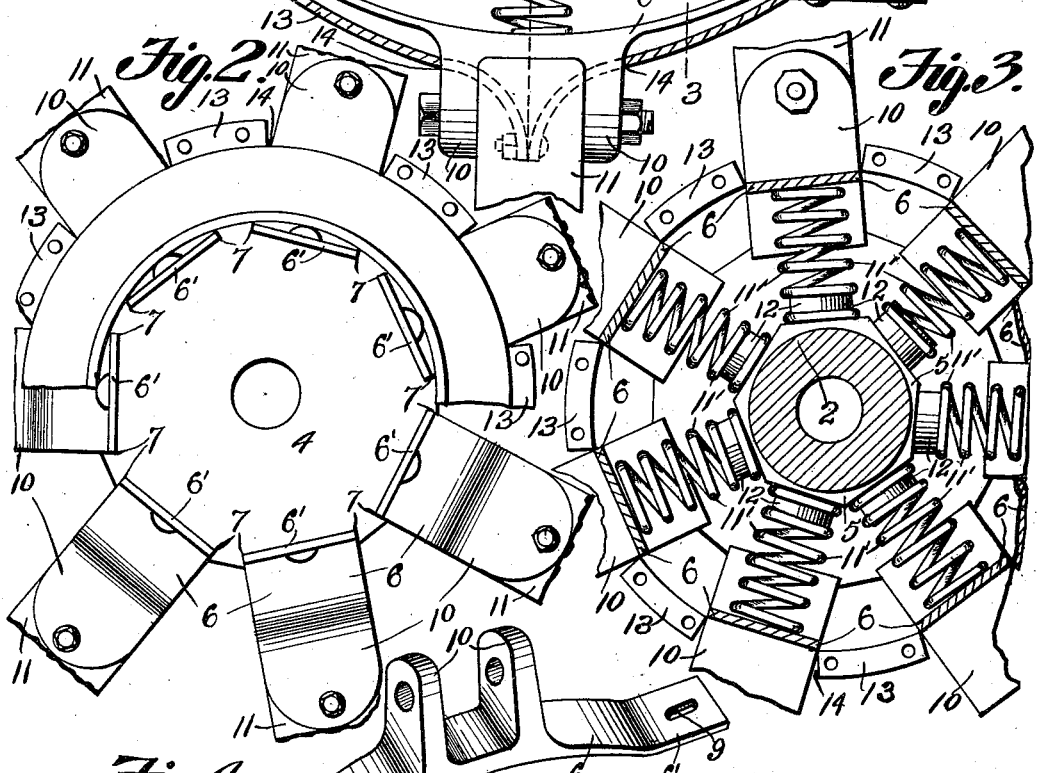
Witnesses
Inventor
Davis A. Pickens
By Wm. C. McIntire
Attorney

UNITED STATES PATENT OFFICE.

DAVIS A. PICKENS, OF MENDENHALL, MISSISSIPPI, ASSIGNOR OF ONE-HALF TO JAMES L. BAREFOOT, OF MENDENHALL, MISSISSIPPI.

SPRING-HUB.

1,013,436.  Specification of Letters Patent.  Patented Jan. 2, 1912.

Application filed May 5, 1911. Serial No. 625,169.

*To all whom it may concern:*

Be it known that I, DAVIS A. PICKENS, a citizen of the United States, residing at Mendenhall, in the county of Simpson and State of Mississippi, have invented certain new and useful Improvements in Spring-Hubs; and I do hereby declare the following to be a full, clear, and exact description of the invention, such as will enable others skilled in the art to which it appertains to make and use the same.

This invention relates to new and useful improvements in spring hubs, and more particularly to that class which are used in connection with wheels for automobiles, bicycles and the like.

The object of this invention is to provide a hub of the class described that will eliminate the use of expensive and destructible pneumatic tires, and at the same time provide the required elasticity for the vehicle.

With these and other objects in view, my invention consists of a novel construction, combination and arrangement of parts, as will be hereinafter fully described and pointed out in the appended claims.

Referring to the accompanying drawings—Figure 1 is a central longitudinal section of the improved hub; Fig. 2 is a front elevation of the same; Fig. 3 is a transverse section taken on the line 3—3 of Fig. 1, and Fig. 4 is a perspective view of one of the leaf springs.

Referring to the drawings by characters of reference, 1 designates a hub, having its spindle sleeve or skein 2 cast of one piece of metal or other suitable material. This spindle 2 consists of two enlarged end portions 4 and a central enlarged portion 5. Extending between the enlarged portions 4 of the spindle sleeve or skein are leaf springs 6. These leaf springs are curved or arched in the center, and terminate in flat end portions 6', which are adapted to slide in grooves 7 formed in each of the said enlarged portions. These flat end portions 6' are secured in the grooves 7 of the enlarged end portions by means of stud bolts or set screws 8. They are also provided with elongated slots 9 to permit the lateral movement of the spring. Centrally located on the upper side of the leaf springs and made integral therewith is an enlarged portion 10, to receive the spokes 11 of the wheel. Mounted between the leaf springs and the faces of the enlarged central portion 5 are coil springs 11', the outward ends of the coil springs resting against the inner face of the leaf springs, and the inner ends resting on the faces of the enlarged central portion and held in place by means of upwardly projecting lugs 12.

It will be seen that I have provided a compact, simple device, and to make the same free from dirt or other foreign matter, and at the same time allow free play, I provide a casing 13, made of two separate pieces, the outer ends of which are secured by means of bolts to the enlarged end portions 4, and their inner ends provided with recesses to receive the spokes 11 and bolt together, as at 14.

Having fully described my invention, what I claim and desire to protect by Letters Patent is:

1. In a device of the class described, consisting of an axle skein having enlarged end portions and a central enlarged portion, leaf springs secured to said enlarged end portions, coil springs between the said enlarged central portion and the said leaf springs, a two-part casing, the outer ends of which are secured to the said enlarged end portions, and their inner ends secured together, spokes secured to said leaf springs and extending through recesses formed in the inner ends of said casings, substantially as described.

2. In a spring hub, the combination, of an axle skein having enlarged end portions and a central enlarged portion, the said enlarged end portions having recesses mounted therein, leaf springs, the ends of which adapted to slide in said recesses, the central portion of said leaf springs being enlarged and having lugs extending therefrom, spokes secured between said lugs, coil springs mounted between said leaf springs and said central enlarged portion, lugs extending radially from said enlarged central portion for holding said coil springs in place and a casing secured to said enlarged end portions for covering said hub, substantially as and for the purpose set forth.

In testimony whereof I affix my signature in presence of two witnesses.

DAVIS A. PICKENS.

Witnesses:
T. F. CRAM,
E. C. BUTLER.

Copies of this patent may be obtained for five cents each, by addressing the "Commissioner of Patents, Washington, D. C."